United States Patent
Harting et al.

(10) Patent No.: US 12,358,169 B2
(45) Date of Patent: Jul. 15, 2025

(54) ROBOTIC CLEANER

(71) Applicant: SHARKNINJA OPERATING LLC, Needham, MA (US)

(72) Inventors: David Harting, Mansfield, MA (US); Jianjun Ge, Shenzhen (CN); Craig Michael Wall, Penarth (GB); Alexander S. Hill, Surrey (GB); Gang Huang, Shenzhen (CN); Junfeng Ding, Shenzhen (CN)

(73) Assignee: SharkNinja Operating LLC, Needham, MA (US)

( * ) Notice: Subject to any disclaimer, the term of this patent is extended or adjusted under 35 U.S.C. 154(b) by 191 days.

(21) Appl. No.: 17/939,323

(22) Filed: Sep. 7, 2022

(65) Prior Publication Data

US 2023/0070147 A1    Mar. 9, 2023

Related U.S. Application Data

(60) Provisional application No. 63/241,350, filed on Sep. 7, 2021.

(51) Int. Cl.
*B25J 19/00* (2006.01)
*B25J 11/00* (2006.01)
(Continued)

(52) U.S. Cl.
CPC ....... *B25J 19/0075* (2013.01); *B25J 11/0085* (2013.01); *B25J 19/022* (2013.01);
(Continued)

(58) Field of Classification Search
CPC .............. A47L 11/4011; A47L 11/4083; A47L 9/2847; A47L 11/4088; A47L 9/2805; A47L 9/2852; A47L 9/2889; A47L 2201/04; A47L 2201/06; B25J 19/022; B25J 11/0085; B25J 19/0075
See application file for complete search history.

(56) References Cited

U.S. PATENT DOCUMENTS

2013/0058635 A1    3/2013   Vrdoljak
2013/0152337 A1    6/2013   Thorne
(Continued)

FOREIGN PATENT DOCUMENTS

CN    110840342    2/2020
CN    213633809    7/2021
(Continued)

OTHER PUBLICATIONS

Machine Translation of JP 2021101812 A to Takagi et al., Jul. 2021. (Year: 2021).*
(Continued)

*Primary Examiner* — Benjamin L Osterhout
(74) *Attorney, Agent, or Firm* — Grossman Tucker Perreault & Pfleger, PLLC

(57) ABSTRACT

A robotic cleaner may include a body having a top surface, a navigation sensor extending from the top surface of the body, a protective cover defining a sensor cavity, the navigation sensor being at least partially received within the sensor cavity, and a cover liquid diverter extending from an upper portion of the protective cover, the cover liquid diverter being flared in a direction of the body.

19 Claims, 11 Drawing Sheets

(51) Int. Cl.
*B25J 19/02* (2006.01)
*A47L 9/28* (2006.01)
*A47L 11/40* (2006.01)

(52) U.S. Cl.
CPC ........... *A47L 9/2805* (2013.01); *A47L 9/2847* (2013.01); *A47L 9/2852* (2013.01); *A47L 9/2889* (2013.01); *A47L 11/4011* (2013.01); *A47L 11/4083* (2013.01); *A47L 11/4088* (2013.01); *A47L 2201/04* (2013.01); *A47L 2201/06* (2013.01)

(56) References Cited

U.S. PATENT DOCUMENTS

| | | |
|---|---|---|
| 2014/0150201 A1 | 6/2014 | McGee et al. |
| 2015/0013102 A1 | 1/2015 | Bilger |
| 2015/0040340 A1 | 2/2015 | Bilger et al. |
| 2015/0135474 A1 | 5/2015 | Gidwell |
| 2015/0297054 A1 | 10/2015 | Weeks et al. |
| 2015/0351596 A1 | 12/2015 | Thorne |
| 2016/0128530 A1 | 5/2016 | Thorne et al. |
| 2016/0174793 A1 | 6/2016 | Burke et al. |
| 2016/0220080 A1 | 8/2016 | Thorne |
| 2016/0220081 A1 | 8/2016 | Xu et al. |
| 2016/0220082 A1 | 8/2016 | Thorne et al. |
| 2016/0236343 A1* | 8/2016 | Neumann ............. A47L 9/2857 |
| 2016/0324388 A1 | 11/2016 | Vrdoljak et al. |
| 2016/0374533 A1 | 12/2016 | Innes et al. |
| 2017/0042319 A1 | 2/2017 | Conrad et al. |
| 2017/0112343 A1 | 4/2017 | Innes et al. |
| 2017/0127896 A1 | 5/2017 | Carter et al. |
| 2017/0144810 A1 | 5/2017 | Birdsell |
| 2017/0215667 A1 | 8/2017 | Thorne et al. |
| 2017/0347848 A1 | 12/2017 | Carter et al. |
| 2018/0035854 A1 | 2/2018 | Thorne |
| 2018/0064301 A1 | 3/2018 | Cottrell et al. |
| 2018/0068815 A1 | 3/2018 | Cottrell |
| 2018/0070785 A1 | 3/2018 | Udy et al. |
| 2018/0184872 A1* | 7/2018 | Kim ..................... B25J 9/1697 |
| 2018/0255991 A1 | 9/2018 | Der Marderosian et al. |
| 2018/0296046 A1 | 10/2018 | Thorne et al. |
| 2018/0306432 A1 | 10/2018 | Ognjen et al. |
| 2018/0325252 A1 | 11/2018 | Hopke et al. |
| 2018/0338654 A1 | 11/2018 | Kelsey |
| 2018/0338656 A1 | 11/2018 | Carter et al. |
| 2019/0038098 A1 | 2/2019 | Thorne et al. |
| 2019/0059668 A1 | 2/2019 | Thorne et al. |
| 2019/0069740 A1 | 3/2019 | Thorne et al. |
| 2019/0069744 A1 | 3/2019 | Liggett et al. |
| 2019/0090701 A1 | 3/2019 | Tonderys et al. |
| 2019/0090705 A1 | 3/2019 | Thorne et al. |
| 2019/0161988 A1 | 5/2019 | Attar et al. |
| 2019/0191947 A1 | 6/2019 | Freese et al. |
| 2019/0193120 A1 | 6/2019 | Brown et al. |
| 2019/0246853 A1 | 8/2019 | Sardar et al. |
| 2019/0274500 A1 | 9/2019 | Thorne et al. |
| 2019/0274501 A1 | 9/2019 | Antonisami et al. |
| 2019/0302793 A1 | 10/2019 | Leech et al. |
| 2019/0320865 A1 | 10/2019 | Brown et al. |
| 2019/0320866 A1 | 10/2019 | Thorne et al. |
| 2019/0335968 A1 | 11/2019 | Harting et al. |
| 2019/0343349 A1 | 11/2019 | Clare et al. |
| 2019/0357740 A1 | 11/2019 | Thorne et al. |
| 2020/0000298 A1 | 1/2020 | Brown et al. |
| 2020/0022543 A1 | 1/2020 | Gill et al. |
| 2020/0022544 A1 | 1/2020 | Gill et al. |
| 2020/0022553 A1 | 1/2020 | Gill et al. |
| 2020/0037833 A1 | 2/2020 | Niedzwecki et al. |
| 2020/0037843 A1 | 2/2020 | Fiebig et al. |
| 2020/0046184 A1 | 2/2020 | Freese et al. |
| 2020/0077855 A1 | 3/2020 | Brown et al. |
| 2020/0085267 A1 | 3/2020 | Thorne et al. |
| 2020/0085269 A1 | 3/2020 | Thorne |
| 2020/0121144 A1 | 4/2020 | Gacin et al. |
| 2020/0121148 A1 | 4/2020 | Hoffman et al. |
| 2020/0138260 A1 | 5/2020 | Sutter et al. |
| 2020/0166949 A1 | 5/2020 | Leech et al. |
| 2020/0170470 A1 | 6/2020 | Liggett et al. |
| 2020/0201348 A1 | 6/2020 | Leech |
| 2020/0205631 A1 | 7/2020 | Brown et al. |
| 2020/0205634 A1 | 7/2020 | Sutter et al. |
| 2020/0237171 A1 | 7/2020 | Xu et al. |
| 2020/0288929 A1 | 9/2020 | Brunner |
| 2020/0288930 A1 | 9/2020 | Wells |
| 2020/0297172 A1 | 9/2020 | Tonderys et al. |
| 2020/0301430 A1 | 9/2020 | Irkliy et al. |
| 2020/0315418 A1 | 10/2020 | Howard et al. |
| 2020/0345196 A1 | 11/2020 | Innes et al. |
| 2020/0367711 A1 | 11/2020 | Thorne et al. |
| 2020/0371526 A1 | 11/2020 | Kamada |
| 2020/0383547 A1 | 12/2020 | Sutter et al. |
| 2021/0007569 A1 | 1/2021 | Howard et al. |
| 2021/0022574 A1 | 1/2021 | Harting |
| 2021/0030227 A1 | 2/2021 | Mathieu et al. |
| 2021/0038032 A1 | 2/2021 | Brown |
| 2021/0059495 A1 | 3/2021 | Gill et al. |
| 2021/0085144 A1 | 3/2021 | Woodrow et al. |
| 2021/0169289 A1 | 6/2021 | Thorne et al. |
| 2021/0175772 A1 | 6/2021 | Aini |
| 2021/0177223 A1 | 6/2021 | Der Marderosian et al. |
| 2021/0186282 A1 | 6/2021 | Mathieu et al. |
| 2021/0204684 A1 | 7/2021 | Heman-Ackah et al. |
| 2021/0254615 A1 | 8/2021 | Vrdoljak et al. |
| 2021/0307581 A1 | 10/2021 | Thorne et al. |
| 2021/0315428 A1 | 10/2021 | Udy et al. |
| 2021/0386261 A1 | 12/2021 | Woodrow et al. |
| 2021/0386262 A1 | 12/2021 | Uchendu et al. |
| 2022/0026920 A1* | 1/2022 | Ebrahimi Afrouzi .... G06N 7/01 |
| 2022/0031131 A1 | 2/2022 | McClay et al. |
| 2022/0031133 A1 | 2/2022 | Der Marderosian et al. |
| 2022/0031134 A1 | 2/2022 | Yang et al. |
| 2022/0061614 A1 | 3/2022 | Yu et al. |
| 2022/0066456 A1* | 3/2022 | Ebrahimi Afrouzi ........................ G06F 3/04883 |
| 2022/0071459 A1 | 3/2022 | Gacin et al. |
| 2022/0095864 A1 | 3/2022 | Der Marderosian et al. |
| 2022/0125256 A1 | 4/2022 | Lessard et al. |
| 2022/0287521 A1 | 9/2022 | Cottrell et al. |
| 2022/0322903 A1 | 10/2022 | Lessard |
| 2022/0400922 A1 | 12/2022 | McClay et al. |
| 2022/0408994 A1 | 12/2022 | Hill |
| 2023/0043567 A1 | 2/2023 | Copeland et al. |
| 2023/0070147 A1 | 3/2023 | Harting et al. |
| 2023/0157495 A1 | 5/2023 | Copeland et al. |
| 2023/0248192 A1 | 8/2023 | Brown et al. |
| 2023/0320550 A1 | 10/2023 | Teuscher et al. |
| 2023/0324515 A1* | 10/2023 | Xing ..................... G05D 1/241 701/49 |
| 2023/0329502 A1 | 10/2023 | Chirikjian |
| 2023/0332934 A1* | 10/2023 | Xing ..................... A47L 9/2805 |
| 2023/0355065 A1 | 11/2023 | Finnegan |
| 2023/0414052 A1 | 12/2023 | McClay et al. |
| 2024/0008699 A1 | 1/2024 | Innes et al. |
| 2024/0415352 A1 | 12/2024 | McClay et al. |

FOREIGN PATENT DOCUMENTS

| | | |
|---|---|---|
| JP | 2021101812 | 7/2021 |
| KR | 102290431 | 8/2021 |

OTHER PUBLICATIONS

Machine Translation of KR 102290431 B1 to Lee, Aug. 2021. (Year: 2021).*

PCT Search Report and Written Opinion mailed Dec. 13, 2022, received in corresponding PCT Application No. PCT/US22/42717, 9 pages.

Partial Supplementary European Search Report dated May 16, 2025, received in European Application No. 22867981.7, 10 pages.

* cited by examiner

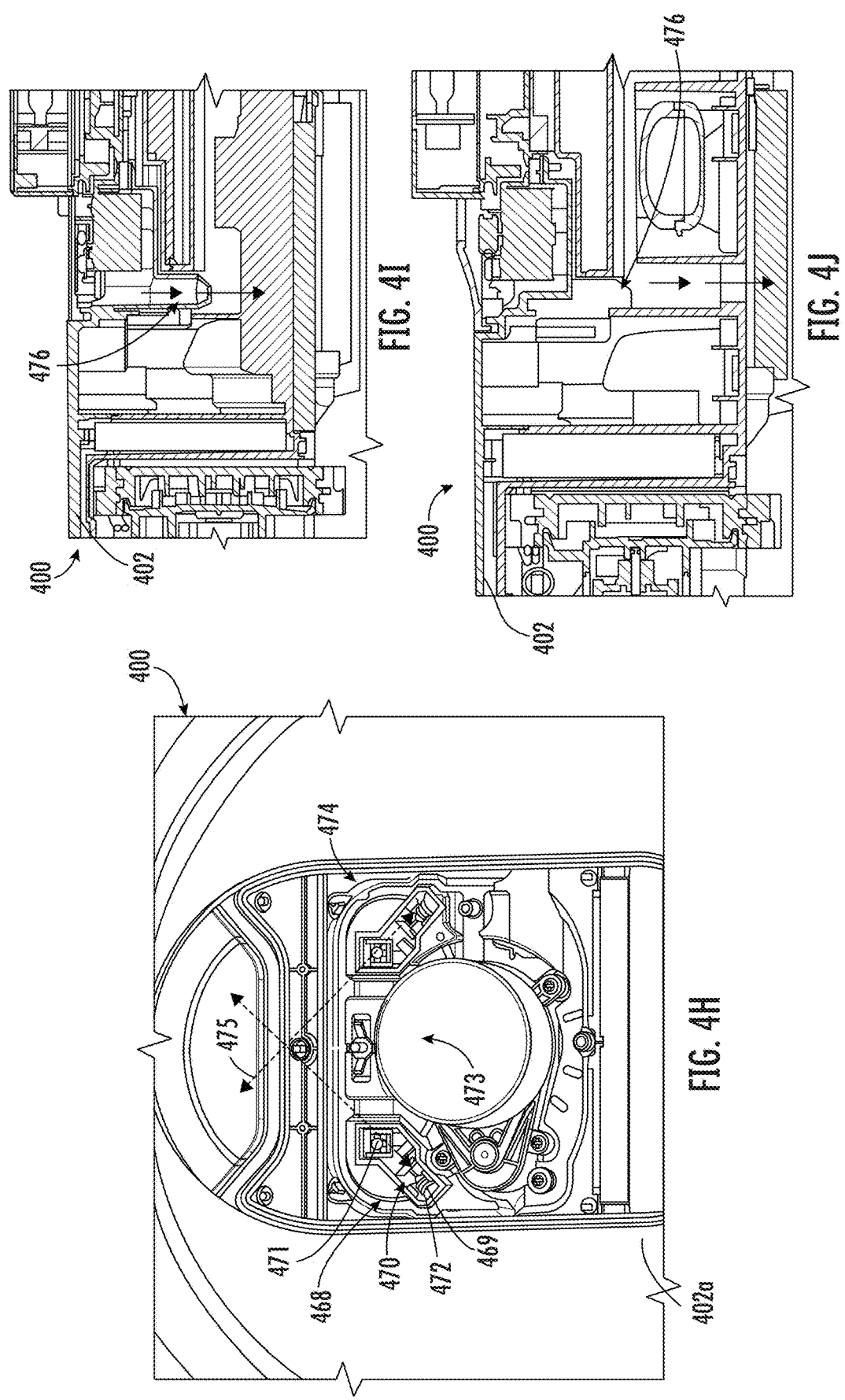

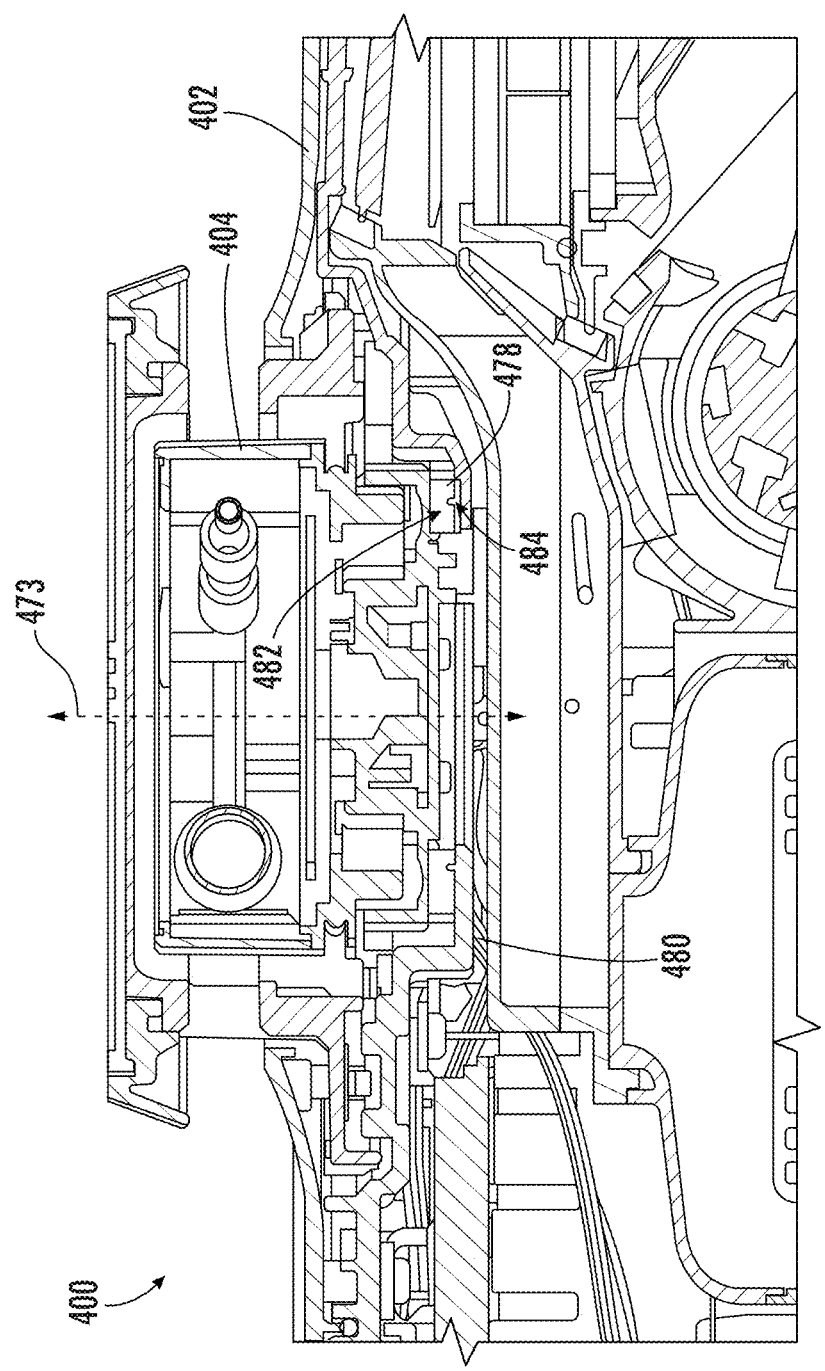

ROBOTIC CLEANER

CROSS-REFERENCE TO RELATED APPLICATIONS

The present application claims the benefit of U.S. Provisional Application Ser. No. 63/241,350 filed on Sep. 7, 2021, entitled Robotic Cleaner, which is fully incorporated herein by reference.

TECHNICAL FIELD

The present disclosure is generally directed to a robotic cleaner and more specifically to a sensor cover for a robotic cleaner.

BACKGROUND INFORMATION

Autonomous cleaning devices (e.g., robotic cleaners) are configured to autonomously traverse (or navigate) a surface while at least partially cleaning the surface. One example of an autonomous cleaning device is a robotic vacuum cleaner. A robotic vacuum cleaner may include a suction motor, a dust cup fluidly coupled to the suction motor, and one or more driven wheels configured to urge the robotic vacuum cleaner across a surface to be cleaned. In operation, the robotic vacuum cleaner traverses the surface to be cleaned while collecting at least a portion of any debris present on the surface to be cleaned.

BRIEF DESCRIPTION OF THE DRAWINGS

These and other features and advantages will be better understood by reading the following detailed description, taken together with the drawings, wherein:

FIG. 4H is a top perspective view of a portion of the robotic cleaner of FIG. 4A having a portion removed therefrom, consistent with embodiments of the present disclosure.

FIG. 4I is a cross-sectional view of a portion of the robotic cleaner of FIG. 4A, consistent with embodiments of the present disclosure.

FIG. 4J is a cross-sectional view of a portion of the robotic cleaner of FIG. 4A, consistent with embodiments of the present disclosure.

FIG. 4K is a cross-sectional view of a portion of the robotic cleaner of FIG. 4A, consistent with embodiments of the present disclosure.

DETAILED DESCRIPTION

The present disclosure is generally directed to a robotic cleaner. The robotic cleaner may include a body, a navigation sensor, a protective cover, and a cover liquid diverter. The navigation sensor extends from a top surface of the body and is at least partially received within a sensor cavity defined by the protective cover. The cover liquid diverter extends from an upper portion of the protective cover, wherein the cover liquid diverter is flared in a direction of the body.

Figure 1:
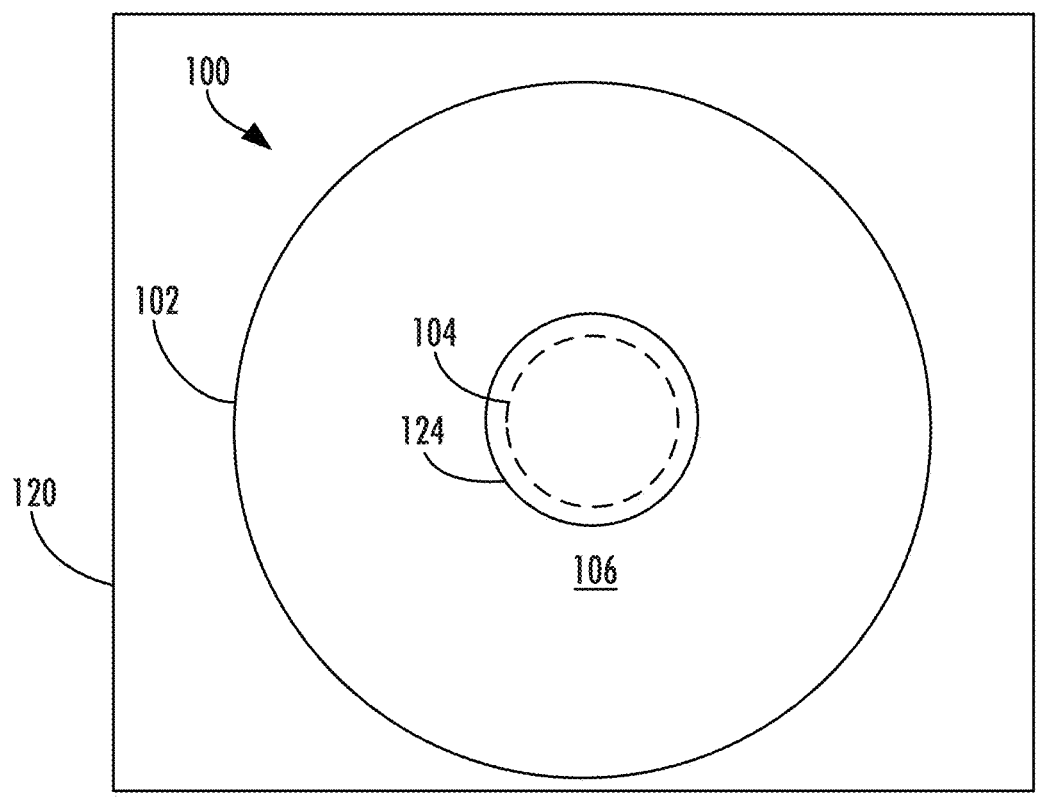
FIG. 1 is a schematic top view of a robotic cleaner, consistent with embodiments of the present disclosure.
Figure 2:
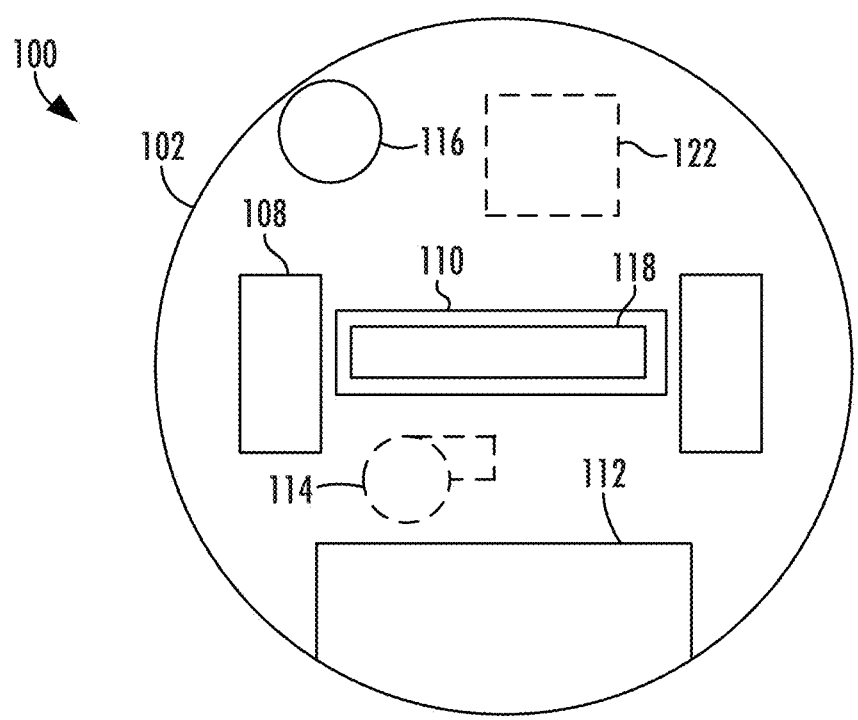
FIG. 2 is a schematic bottom view of the robotic cleaner of FIG. 1, consistent with embodiments of the present disclosure.

FIG. 1 shows a schematic top view of an example of a robotic cleaner 100 and FIG. 2 shows a schematic bottom view of the robotic cleaner 100 of FIG. 1. As shown, the robotic cleaner 100 includes a body 102, a navigation sensor 104 extending from a body top surface 106 of the body 102, one or more driven wheels 108, a suction inlet 110 fluidly coupled to a removable dust cup 112, and a suction motor 114 fluidly coupled to the suction inlet 110 such that the suction motor 114 causes air to be drawn in through the suction inlet 110. The robotic cleaner 100 may further include at least one side brush 116 configured to urge debris in a direction of a movement path of the suction inlet 110 and/or at least one agitator (e.g., brush roll) 118 disposed proximate to the suction inlet 110, wherein the at least one agitator is configured to disturb debris on a surface to be cleaned 120.

The navigation sensor 104 is communicatively coupled to a robot controller 122. The navigation sensor 104 is configured to detect one or more obstacles (e.g., walls or furniture) within a surrounding environment (e.g., a room within a home). The navigation sensor 104 can be configured to detect a distance to an obstacle. Based on the detected obstacles, the robot controller 122 can be configured to generate a map of the surrounding environment. The generated map may be stored for use during future cleaning runs (e.g., such that the robot controller 122 can generate a path plan for cleaning the mapped environment).

The navigation sensor 104 can be a 360° sensor configured to detect obstacles at locations around the robotic cleaner 100. The navigation sensor 104 can be configured to rotate when detecting obstacles around the robotic cleaner 100. For example, the navigation sensor 104 can be a light detection and ranging (LIDAR) sensor configured to rotate through a rotation angle of at least 360°. In this example, the LIDAR sensor may be configured to use triangulation to determine a distance to an obstacle.

As shown, the navigation sensor 104 is at least partially received within a protective cover 124. The protective cover 124 is configured to prevent obstacles from engaging (e.g., contacting) at least a portion of the navigation sensor 104, mitigating a risk of damage to the navigation sensor 104. In some instances, the protective cover 124 may be configured to move (e.g., horizontally and/or vertically) in response to engaging an obstacle. In these instances, movement of the protective cover 124 may be configured to actuate one or more obstacle sensors (e.g., tactile switches), wherein actuation of the one or more obstacle sensors causes the robotic cleaner 100 to engage in an obstacle avoidance behavior.

Figure 3:
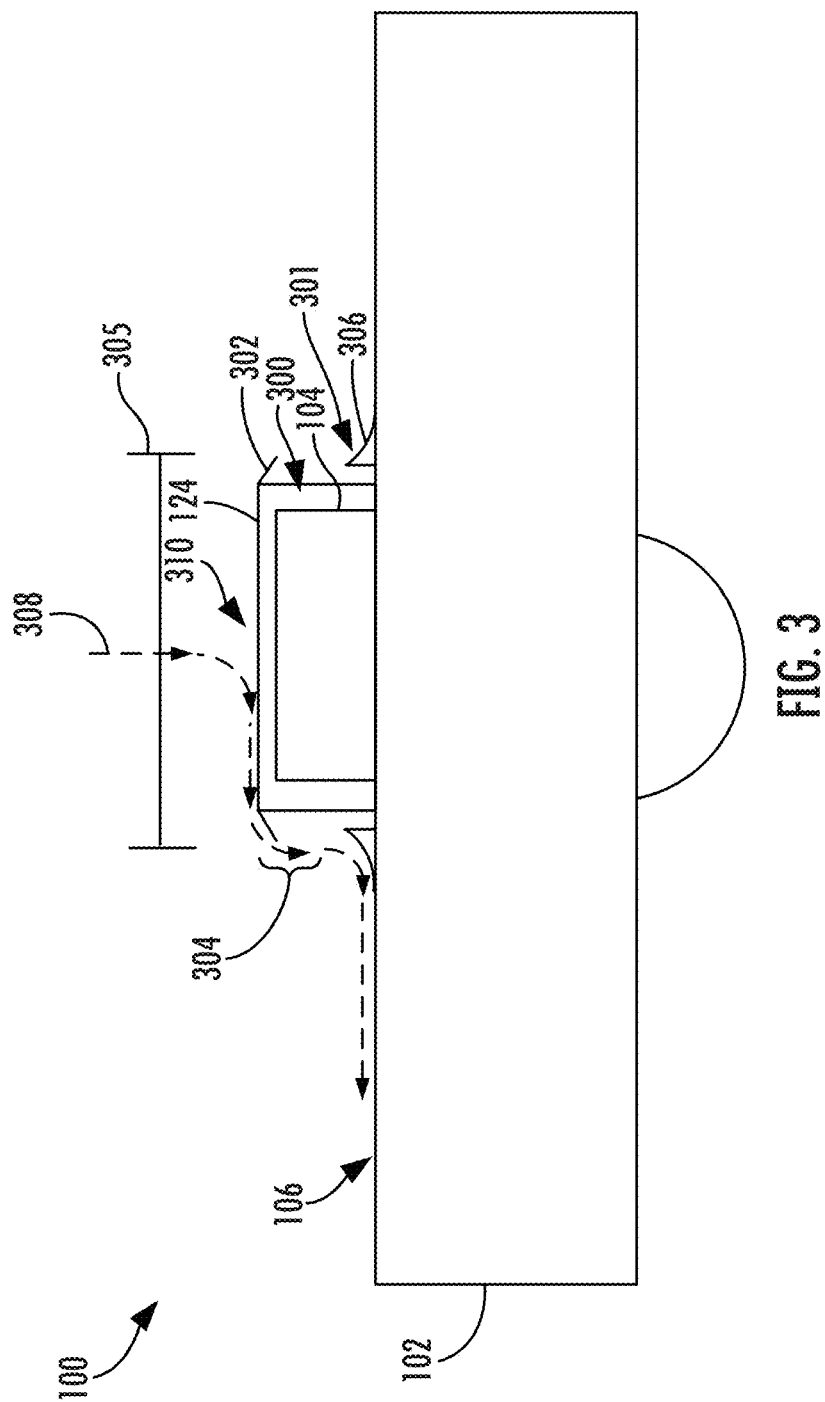
FIG. 3 is a schematic side view of the robotic cleaner of FIG. 1, consistent with embodiments of the present disclosure.

FIG. 3 shows a side view of the robotic cleaner 100 of FIG. 1. As shown, the protective cover 124 defines a sensor cavity 300 configured to receive at least a portion of the navigation sensor 104. The sensor cavity 300 is configured such that the navigation sensor 104 can rotate within the sensor cavity 300 without engaging the protective cover 124. In some instances, the protective cover 124 can include one or more cover liquid diverters 302 configured to direct liquid incident on the protective cover 124 in a direction away from the navigation sensor 104. For example, the one or more cover liquid diverters 302 can extend outwardly (in a direction away from the navigation sensor 104) from an upper portion 304 of the protective cover 124 (e.g., an upper 50% of the protective cover 124) and in a direction of the body top surface 106 of the body 102. In some instances, the one or more cover liquid diverters 302 may generally be described as being flared in a direction approaching the body 102 (e.g., a width 305 of the one or more cover liquid diverters 302 increases in a direction of the body 102). The one or more cover liquid diverters 302 can be shaped to direct liquid away from the navigation sensor 104.

In some instances, the body top surface 106 of the body 102 may be configured to divert liquid in a direction away from the navigation sensor 104. For example, the body 102 (e.g., the body top surface 106) may include and/or define one or more body liquid diverters 306.

The one or more body liquid diverters 306 may include one or more sloped surfaces 301 that urge liquid in a direction away from the navigation sensor 104 (e.g., a direction radially outward from the navigation sensor 104). In some instances, the one or more body liquid diverters 306 are configured to cooperate with the one or more cover liquid diverters 302 (e.g., to urge liquid in a direction away from the navigation sensor 104). For example, the one or more body liquid diverters 306 can be configured to reduce or prevent a splashing of liquid that is incident on the one or more body liquid diverters 306 into the navigation sensor 104. While the one or more body liquid diverters 306 are shown as extending from the body top surface 106 in a direction of the one or more cover liquid diverters 302, other configurations are possible. For example, the one or more body liquid diverters 306 may be channels defined within the body top surface 106 of the body 102. By way of further example, the one or more body liquid diverters 306 may be coupled to or formed from the protective cover 124.

FIG. 3 shows an example liquid flow path 308 for a liquid incident on a cover top surface 310 of the protective cover 124. As shown, the liquid flow path 308 extends along the cover top surface 310 and along the one or more cover liquid diverters 302. The one or more cover liquid diverters 302 urge liquid flowing along the liquid flow path 308 in a direction away from the navigation sensor 104. From the one or more cover liquid diverters 302, the liquid flow path 308 extends towards the body top surface 106 and is incident on the one or more body liquid diverters 306. The one or more body liquid diverters 306 encourage liquid flowing along the liquid flow path 308 to flow in a direction away from the navigation sensor 104 (e.g., radially outward from the navigation sensor 104) and along the body top surface 106. From the one or more body liquid diverters 306, the liquid flow path 308 extends along at least a portion of the body top surface 106. Additionally, or alternatively, the liquid flow path 308 may extend into one or more drain openings that divert liquid to the surface to be cleaned 120. In these instances, the body top surface 106 may be configured to urge liquid flowing along the body top surface 106 towards the one or more drain openings (e.g., the body top surface 106 may be sloped).

Figure 4A:
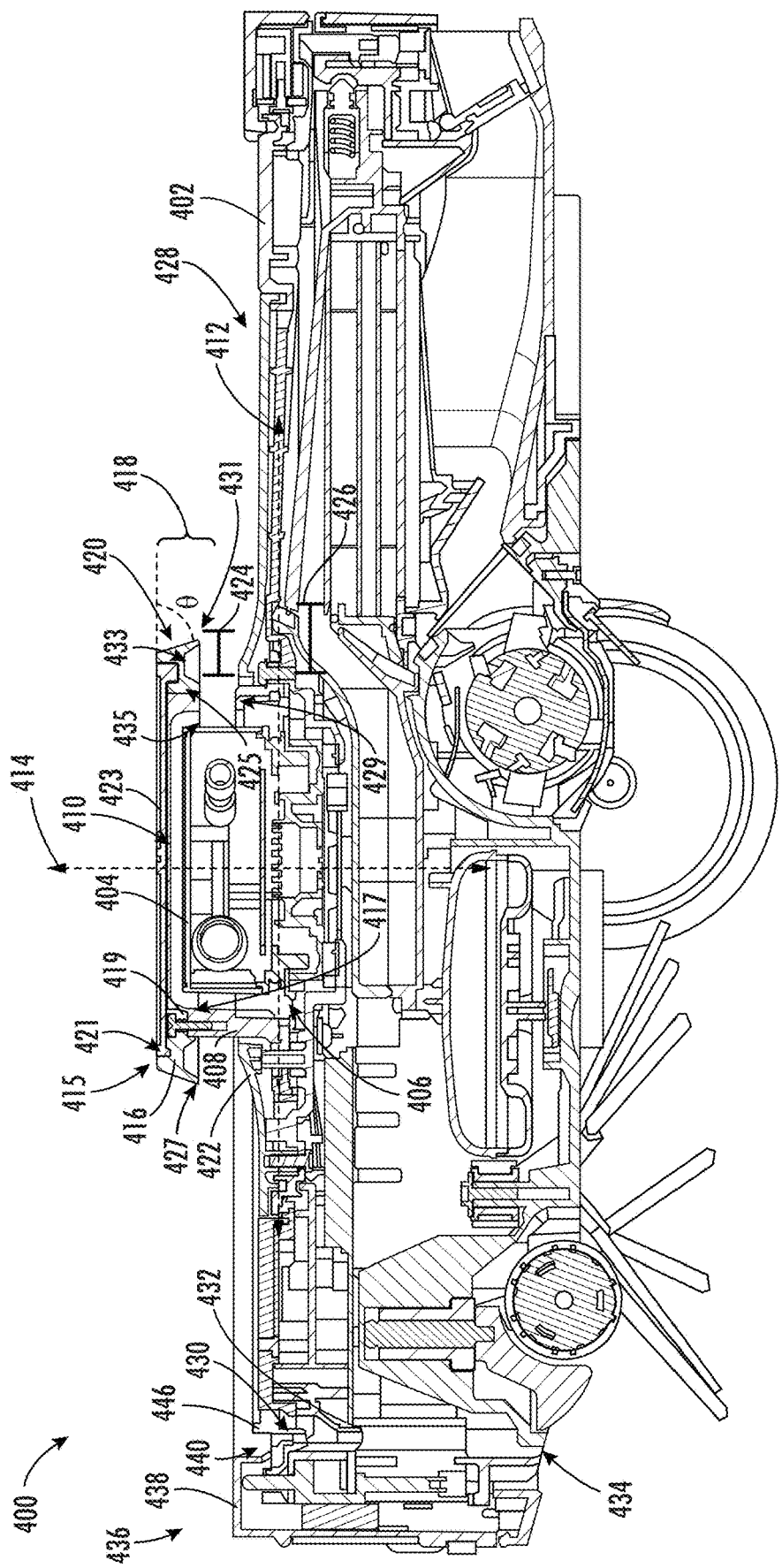
FIG. 4A is a cross-sectional view of a robotic cleaner, consistent with embodiments of the present disclosure.

FIG. 4A shows a cross-sectional side view of a robotic cleaner 400, which may be an example of the robotic cleaner 100 of FIG. 1. As shown, the robotic cleaner includes a body 402, a LIDAR sensor 404 extending through a LIDAR opening 406 defined in the body 402, and a protective cover 408 defining a cover cavity 410 for receiving at least a portion of the LIDAR sensor 404. At least a portion of the LIDAR sensor 404 is configured to rotate within the cover cavity 410.

The protective cover 408 can be configured to move along one or more horizontal axes 412 and/or a vertical axis 414 in response to the protective cover 408 engaging (e.g., contacting) an obstacle. Movement of the protective cover 408 may actuate one or more sensors (e.g., tactile switches or optical switches) and cause the robotic cleaner 400 to carry out an obstacle avoidance behavior.

As shown, a cover liquid diverter 416 extends from an upper portion 418 of the protective cover 408. For example, the cover liquid diverter 416 may extend radially outward from the protective cover 408. In some instances, the cover liquid diverter 416 may have an annular shape. The cover liquid diverter 416 may be coated with and/or be formed from a hydrophobic material.

In some instances, and as shown, the cover liquid diverter 416 may define a protective cover receptacle 417 for receiving at least a portion of the protective cover 408. The protective cover receptacle 417 may include one or more mounting features 419 configured to mount the cover liquid diverter 416 to the protective cover 408. The one or more mounting features 419 may be configured to receive one or more fasteners (e.g., threaded fasteners), define a portion of a snap-fit connection, define a portion of a press-fit connection, and/or any other type of coupling. Additionally, or alternatively, the cover liquid diverter 416 may be adhesively coupled to the protective cover 408. As also shown, the cover liquid diverter 416 may define a plate receptacle 421 configured to receive at least a portion of a plate 423. The plate 423 may generally be described as forming at least a portion of a cover top surface 415 of the protective cover 408 when the plate 423 is received within the plate receptacle 421. The plate 423 is configured to cover a joint 425 defined between the protective cover 408 and the cover liquid diverter 416 and/or cover the one or more mounting features 419. Such a configuration may mitigate and/or prevent liquid ingress into the joint 425 and/or the mounting features 419.

The cover liquid diverter 416 can be configured such that the robotic cleaner 400 meets the ingress protection standard IPX2. The cover liquid diverter 416 can be flared such that liquid flowing along the liquid diverter 416 is urged outwardly from the LIDAR sensor 404. For example, a diameter of an annular cover liquid diverter 416 may increase as the cover liquid diverter 416 approaches the body 402. In other words, the diameter may increase in a direction of the body 402. As shown, a flare angle θ is formed between a plane (e.g., a horizontal plane) extending substantially (e.g., within 1°, 2°, 3°, 4°, or 5° of) parallel to at least a portion of the cover top surface 415 and a liquid surface 420 of the cover liquid diverter 416. The flare angle θ may be configured such that the cover liquid diverter 416 urges liquid outwardly from the LIDAR sensor 404 when the robotic cleaner 400 is angled up to 15° relative to a horizontal plane (e.g., a surface to be cleaned). The flare angle θ may be, for example, in a range of 50° to 85°. By way of further example, the flare angle may be in a range of 65° to 80°. By way of still further example, the flare angle θ may be 75°.

As shown, the cover liquid diverter 416 includes a run-off edge 427. The run-off edge 427 may generally be described as the edge of the liquid diverter 416 from which liquid flows off of the cover liquid diverter 416. The run-off edge 427 is spaced apart from a body top surface 428 of the body 402. For example, the run-off edge 427 may be positioned at or above a top edge 435 of a viewing aperture 429 of the protective cover 408. The viewing aperture 429 is configured to allow the LIDAR sensor 404 to emit and receive signals through the viewing aperture 429. As such, the cover liquid diverter 416 can be configured to not interfere with operation of the LIDAR sensor 404. In some instances, the viewing aperture 429 may be open (i.e., have no light transmissive materials extending within the viewing aperture 429).

As also shown, the run-off edge 427 is spaced apart from an outer perimeter of the protective cover 408. In some instances, a bottom surface 431 of the cover liquid diverter 416 defines a diverter channel 433. The diverter channel 433 is horizontally disposed between the run-off edge 427 and the outer perimeter of the protective cover 408. The diverter channel 433 may mitigate and/or prevent liquid from flowing from the run-off edge 427 and along at least a portion of the bottom surface 431 of the cover liquid diverter 416. The diverter channel 433 is shown in FIG. 4A as having a trapezoidal shape; however, the diverter channel 433 may have any shape (see, e.g., FIG. 4C showing the diverter channel 433 having an irregular shape with one or more arcuate portions).

The body 402 may include a body liquid diverter 422. The body liquid diverter 422 may be coupled to or formed from the body 402. The body liquid diverter 422 is configured to cooperate with the cover liquid diverter 416 to urge liquid in a direction away from the LIDAR sensor 404 (e.g., in a direction radially outward from the LIDAR sensor 404). For example, and as shown, the cover liquid diverter 416 may horizontally overlap with at least a portion of the body liquid diverter 422 by a horizontal overlap distance 424. In this example, when liquid flows off the cover liquid diverter 416, at least a portion of the liquid may be incident on at least a portion of the body liquid diverter 422. The horizontal overlap distance 424 may be selected to mitigate a quantity of liquid that splashes into the cover cavity 410 when liquid is incident on the body liquid diverter 422. For example, the horizontal overlap distance 424 may be at least 25%, at least 35%, at least 40%, at least 45%, or at least 50% of a horizontal length 426 of the body liquid diverter 422.

At least a portion of the body liquid diverter 422 can be configured to urge liquid along the body top surface 428 of the body 402 and towards a drain opening 430. For example, the body top surface 428 can be shaped to urge liquid in a direction of the drain opening 430. The drain opening 430 is fluidly coupled to a liquid passage 432 that extends within the body 402 from the drain opening 430 to a drain outlet 434. Liquid passing through the drain outlet 434 may be deposited on a surface to be cleaned (e.g., a floor). As shown, the drain opening 430 is positioned between a forward most portion 436 (e.g., a moveable bumper 438 moveably coupled to a forward portion of the body 402, wherein the moveable bumper 438 defines the forward most portion 436) of the robotic cleaner 100 (relative to a forward direction of movement) and the LIDAR sensor 404.

As shown, the body liquid diverter 422 flares outwardly from the LIDAR sensor 404. For example, the body liquid diverter 422 transitions from a first height proximate the LIDAR sensor 404 to a second height, the first height being greater than the second height. As such, liquid incident on the body liquid diverter 422 is encouraged to flow in a direction away from the LIDAR sensor 404.

Figure 4B:
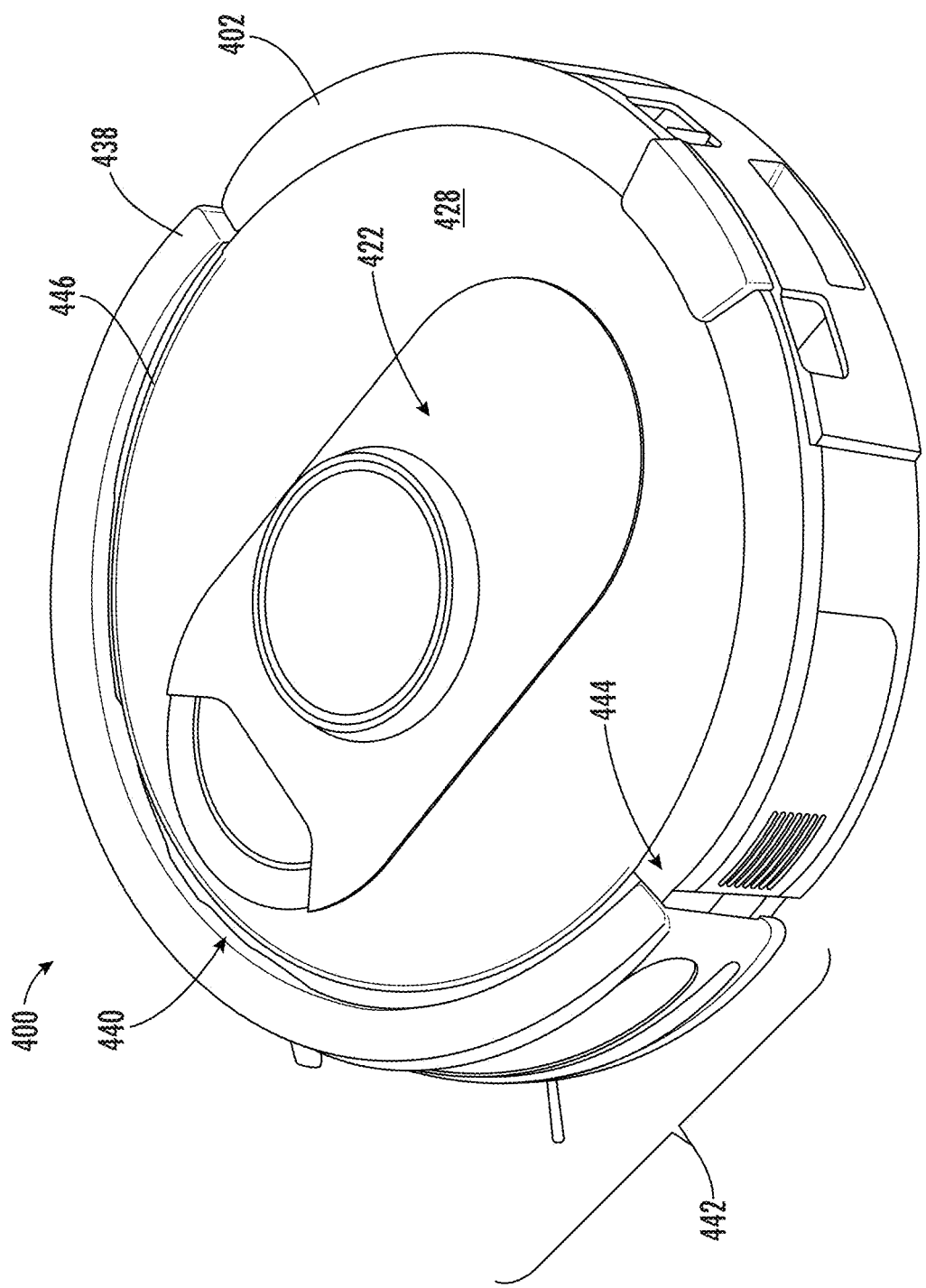
FIG. 4B is a top perspective view of the robotic cleaner of FIG. 4A, consistent with embodiments of the present disclosure.
Figure 4C:
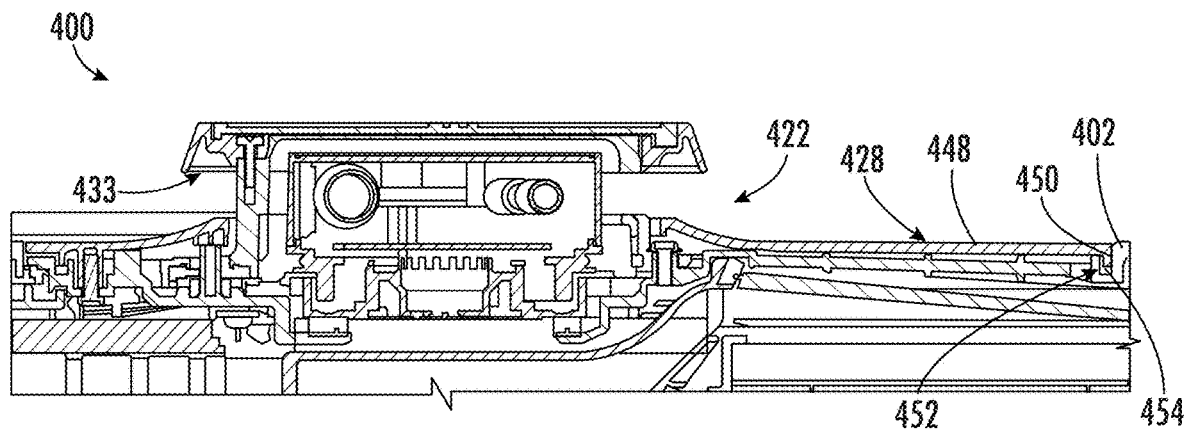
FIG. 4C is a cross-sectional view of a portion of the robotic cleaner of FIG. 4A, consistent with embodiments of the present disclosure.

FIG. 4B shows a top view of the robotic cleaner 400. As shown, the body 402 includes (e.g., defines) a body channel 440. The body channel 440 can extend along at least a portion of a forward portion 442 of the body 402. For example, the body channel 440 may extend along a substantial portion (e.g., an entire portion) of the forward portion 442. The forward portion 442 of the body 402 may generally be described as the portion of the body 402 that lies forward of a rotation axis of the driven wheels of the robotic cleaner 400.

The moveable bumper 438 may extend over at least a portion of the body channel 440. In some instances, the body channel 440 may be configured to encourage liquid to flow in a direction of the drain opening 430. Additionally, or alternatively, the body channel 440 may include one or more open ends 444, wherein liquid is capable of flowing from the body channel 440 and through the one or more open ends 444.

In some instances, a ridge 446 may extend between the body channel 440 and the body liquid diverter 422. For example, the ridge 446 may extend along an edge of the body channel 440. In this example, the ridge 446 may extend along substantially (e.g., at least 90%, at least 95%, or at least 99%) an entire length of the edge of the body channel 440. The ridge 446 can be configured to impede a flow of liquid into the body channel 440 (e.g., that flows from the body liquid diverter 422). As such, a small quantity of liquid incident on the robotic cleaner 400 may be collected on the body top surface 428 to be cleaned by a user and/or directed to flow from a side of the robotic cleaner 400 and on to a surface to be cleaned. Such a configuration may mitigate the risk of liquid becoming trapped between the moveable bumper 438 and the body 402 and/or the risk of the drain opening 430 becoming clogged. As such, the body channel 440 and drain opening 430 may be generally described as cooperating with the body liquid diverter 422 to mitigate risk of damage from large quantities of liquid and the ridge 446 and the body liquid diverter 422 may be generally described as cooperating to mitigate risk of damage from small quantities of liquid.

Figure 4D:
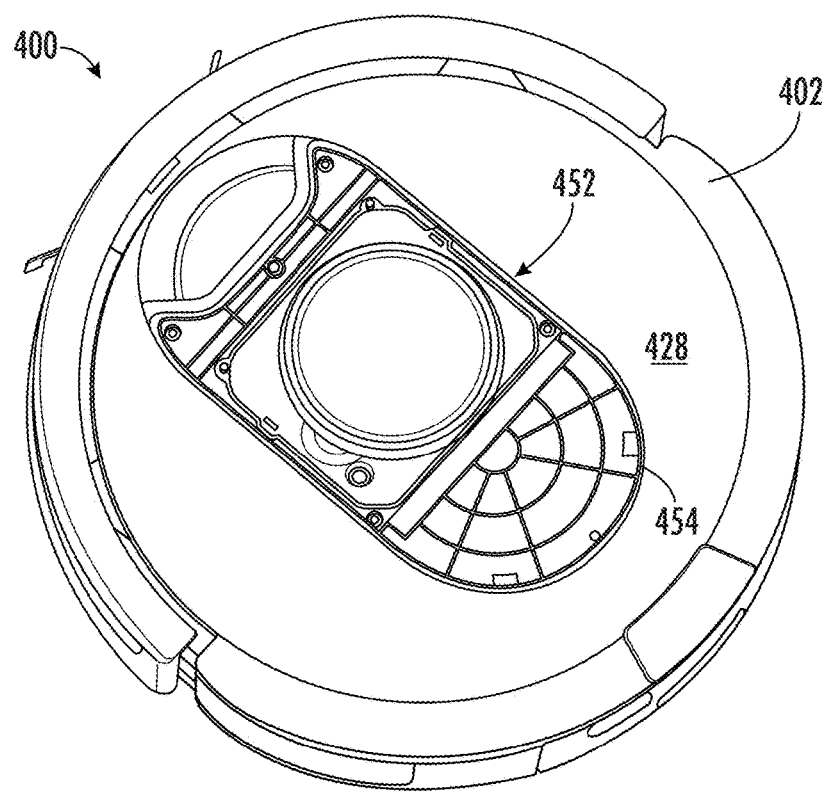
FIG. 4D is a top perspective view of the robotic cleaner of FIG. 4A having a portion removed therefrom, consistent with embodiments of the present disclosure.

FIG. 4C shows a cross-sectional view of the robotic cleaner 400 and FIG. 4D shows a top perspective view of the robotic cleaner 400 having a portion of the body top surface 428 removed therefrom. As shown, the body top surface 428 may be at least partially defined by a plate 448 that is coupled to the body 402. The plate 448 may define the body liquid diverter 422. As shown, the plate 448 may include a flange 450 configured to be received at least partially within a slot 452 defined within the body 402. The slot 452 extends around and encloses an area that includes the LIDAR sensor 404. The slot 452 may include a body seal 454 extending therein. The body seal 454 can extend continuously within the slot 452. The flange 450 can be configured to engage the body seal 454 to mitigate an ingress of water between the plate 448 and the body 402.

Figure 4E:
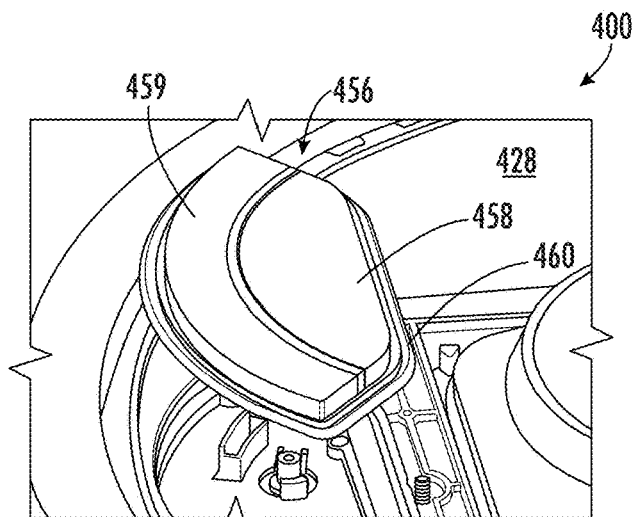
FIG. 4E is an exploded view of a portion of the robotic cleaner of FIG. 4A, consistent with embodiments of the present disclosure.
Figure 4F:
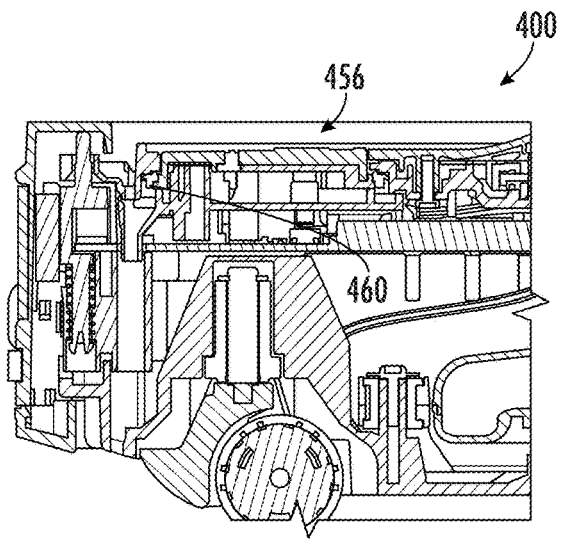
FIG. 4F is a cross-sectional view of a portion of the robotic cleaner of FIG. 4A, consistent with embodiments of the present disclosure.
Figure 4G:
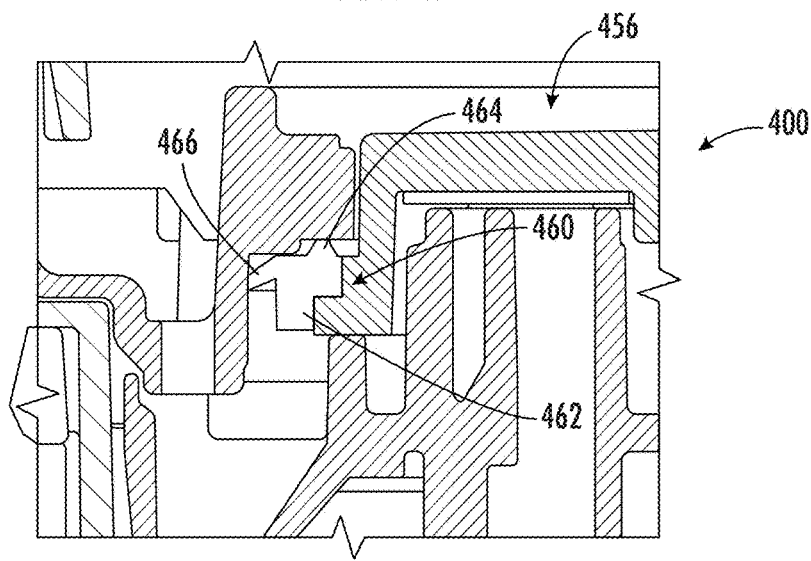
FIG. 4G is a magnified cross-sectional view of a portion of the robotic cleaner of FIG. 4A, consistent with embodiments of the present disclosure.

FIG. 4E shows an exploded view of a portion of the robotic cleaner 400, FIG. 4F shows a cross-sectional view of a portion of the robotic cleaner 400, and FIG. 4G shows a magnified view of a portion of the cross-sectional view of FIG. 4F. As shown, the robotic cleaner 400 includes a user interface 456 having one or more buttons 458 and/or a display 459. The user interface 456 is configured to receive one or more inputs from a user via the one or more buttons 458. For example, the user may interact with the one or more buttons 458 to cause the robotic cleaner 400 to carry out one or more cleaning operations.

As shown, the user interface 456 includes an interface seal 460 that extends about a periphery of the one or more buttons 458 and/or the display 459. The interface seal 460 is configured to mitigate and/or prevent the ingress of liquid into the body 402. Such a configuration may mitigate the risk of damaging one or more internal components of the robotic cleaner 400.

The interface seal 460 may include a seal base 462 having a first seal protrusion 464 and a second seal protrusion 466. The first and second seal protrusions 464 and 466 may extend from different surfaces (e.g., intersecting or orthogonal surfaces) of the seal base 462. The first seal protrusion 464 may extend in a direction of the body top surface 428 and the second seal protrusion 466 may extend in a direction away from the body top surface 428 and in a direction outward from the one or more buttons 458. The first and second seal protrusions 464 and 466 are configured to engage with a corresponding portion of the body 402 to form a seal with the body 402 (e.g., an at least partially liquid tight seal, an at least partially dust tight seal, and/or any other type of seal).

FIG. 4H shows a top perspective view of a portion of the robotic cleaner 400 having a portion of the body top surface 428 removed therefrom, FIG. 4I shows a cross-sectional view of a portion of the robotic cleaner 400, and FIG. 4J shows another cross-sectional view of a portion of the robotic cleaner 400. As shown, the robotic cleaner 400 includes one or more cover bump sensors 468. The one or more cover bump sensors 468 may be coupled to the body 402. For example, at least one of the one or more cover bump sensors 468 may be disposed within one or more receptacles 470 defined within the body 402. Each receptacle 470 is configured to receive a portion of the protective cover 408 such that when the protective cover 408 moves in response to engaging (e.g., contacting) an obstacle, the protective cover 408 actuates at least one of the one or more cover bump sensors 468. The one or more cover bump sensors 468 may be, for example, a tactile or optical switch.

Each receptacle 470 includes sidewalls 472. The sidewalls 472 divert liquid away from corresponding one or more cover bump sensors 468 disposed within the receptacle 470. The diverted liquid may flow into a cover bump sensor channel 474. The cover bump sensor channel 474 may extend around the one or more bump sensors 468. The cover bump sensor channel 474 is fluidly coupled to a drain passage 476. The drain passage 476 is configured to allow liquid to pass through the robotic cleaner 400 and back into the environment. For example, the drain passage 476 may be fluidly coupled to the drain outlet 434 (see, FIG. 4A) and/or any other outlet. As such, the cover bump sensor channel 474 and the drain passage 476 may generally be described as being configured to cooperate to direct fluid through the robotic cleaner 400 in a manner that mitigates the risk of liquid becoming incident on one or more internal components of the robotic cleaner 400 (e.g., a robot controller).

The one or more cover bump sensors 468 may include at least one horizontal bump sensor 469 and at least one vertical bump sensor 471. As shown, the one or more cover bump sensors 468 may include a plurality of horizontal bump sensors 469 disposed on opposing sides of a rotation axis 473 of the LIDAR sensor 404. Each of the horizontal bump sensors 469 includes an actuation axis 475. The actuation axes 475 of the horizontal bump sensors 469 may converge in a direction of the moveable bumper 438. In some instances, the horizontal bump sensors 469 may be oriented such that the actuation axes 475 converge to intersect at a location between the moveable bumper 438 and the LIDAR sensor 404. In some instances, the actuation axes 475 may intersect at a substantially (e.g., within 1°, 2°, 3°, 4°, or 5° of) perpendicular angle.

FIG. 4K shows a cross-sectional view of a portion of the robotic cleaner 400. As shown, a LIDAR seal 478 is disposed between the LIDAR sensor 404 and the body 402. The LIDAR seal 478 may extend around the rotation axis 473 of the LIDAR sensor 404 (e.g., the LIDAR seal 478 may be an annular seal that extends around the rotation axis of the LIDAR sensor 404). The LIDAR seal 478 may be configured to mitigate or prevent liquid ingress at a region between the LIDAR sensor 404 and the body 402. Such a configuration may mitigate or prevent liquid from being incident on one or more components of the robotic cleaner 400 that are disposed beneath the LIDAR sensor 404. The LIDAR seal 478 may be configured to allow one or more electrical conductors 480 (e.g., wires) to pass between the LIDAR sensor 404 and the body 402. For example, the LIDAR seal 478 may be configured to sealingly engage with at least a portion of the one or more electrical conductors 480. The LIDAR seal 478 may be a foam seal.

As shown, the LIDAR seal 478 includes a seal alignment feature 482 configured to cooperate with a corresponding body alignment feature 484 to align the LIDAR seal 478 relative to the LIDAR sensor 404 and/or the body 402. For example, the seal alignment feature 482 may be an alignment groove and the body alignment feature 484 may be an alignment protrusion. By way of further example, the body alignment feature 484 may be an alignment groove and the seal alignment feature 482 may be an alignment protrusion.

Figure 4L:
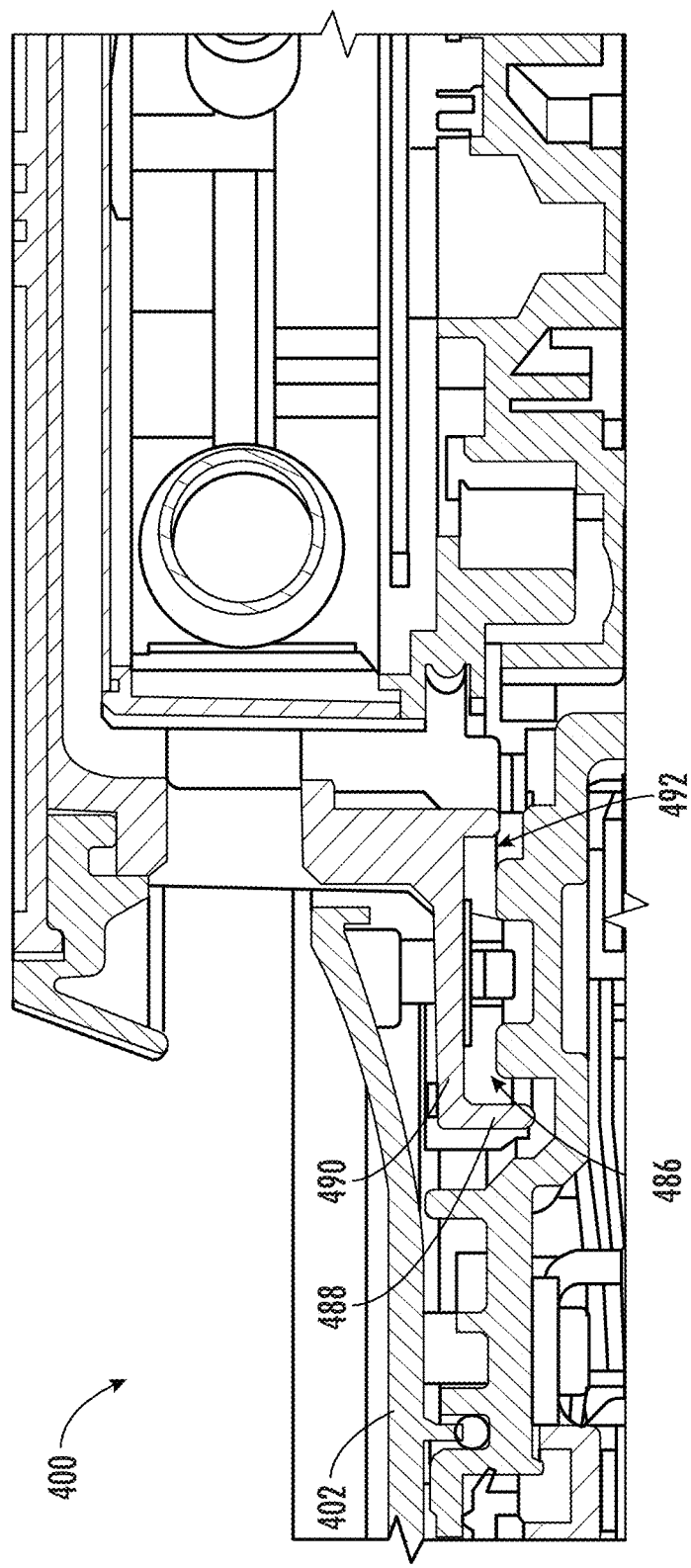
FIG. 4L is a cross-sectional view of a portion of the robotic cleaner of FIG. 4A, consistent with embodiments of the present disclosure.

FIG. 4L shows a magnified cross-sectional view of a portion of the robotic cleaner 400. As shown, the protective cover 408 includes a cover channel 486 defined by one or more sidewalls 488 (e.g., opposing side walls) and a base 490. The one or more sidewalls 488 are configured to mitigate and/or prevent liquid ingress into the body 402. For example, the channel 486 may define at least part of an impeding path 492 along which liquid must flow before entering the body 402. The impeding path 492 is configured to impede a flow of liquid along the impeding path 492, which discourages a flow of liquid into the body 402. At least a portion of the impeding path 492 may extend between the body 402 and the channel 486.

Figure 5:
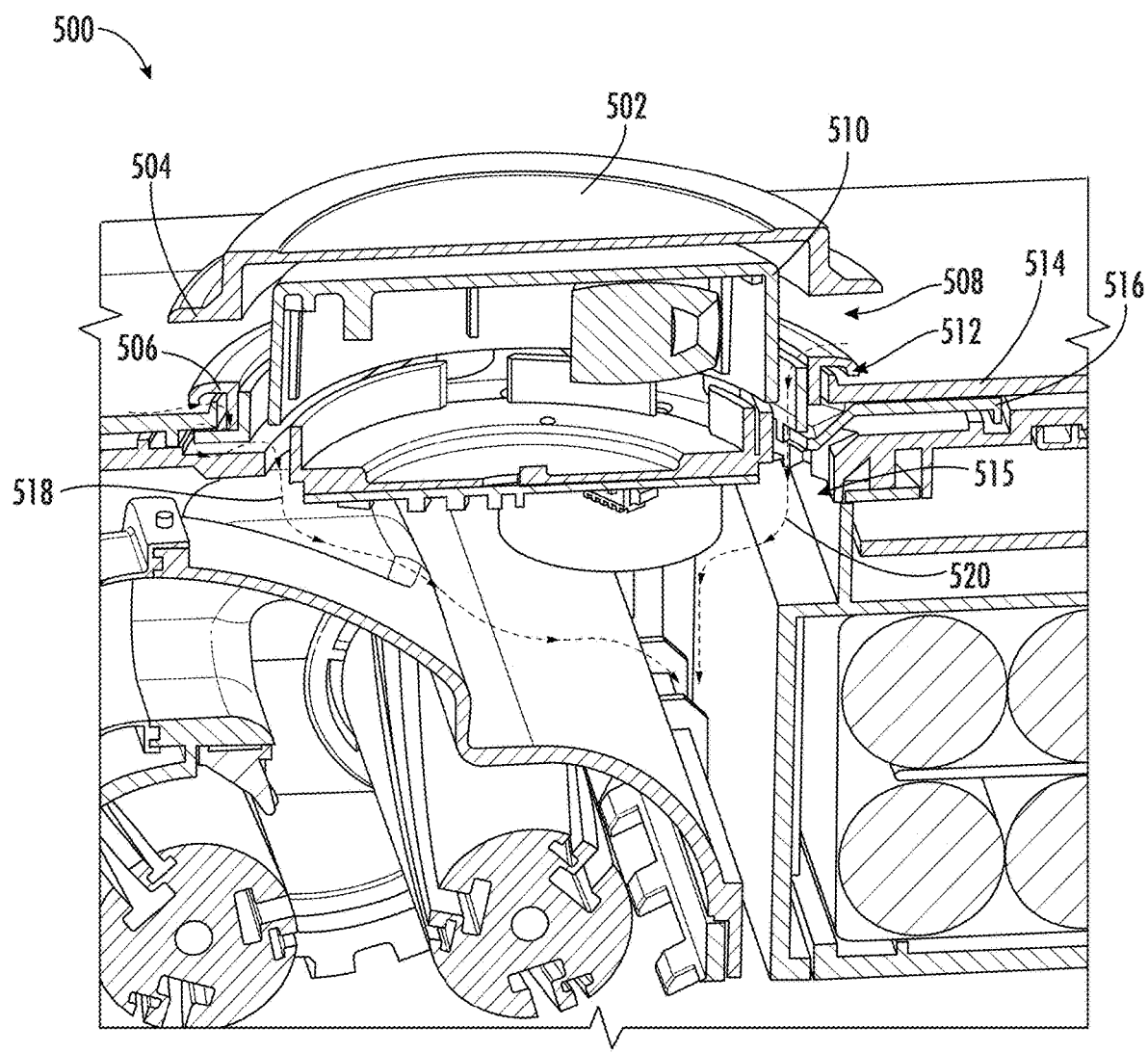
FIG. 5 is a cross-sectional view of a portion of a robotic cleaner, consistent with embodiments of the present disclosure.

FIG. 5 shows a cross-sectional view of a portion of a robotic cleaner 500, which may be an example of the robotic cleaner 100 of FIG. 1, having a protective cover 502, which may be an example of the protective cover 124 of FIG. 1. As shown, the protective cover 502 includes a first liquid diverter 504 and a second liquid diverter 506, the second liquid diverter 506 being vertically spaced apart from the first liquid diverter 504. For example, the first and second liquid diverters 504 and 506 may be on opposite sides of a viewing aperture 508 of the protective cover 502. The first and second liquid diverters 504 and 506 may be configured to urge liquid in a direction away from a navigation sensor 510 that is at least partially received within the protective cover 502.

Figure 6:
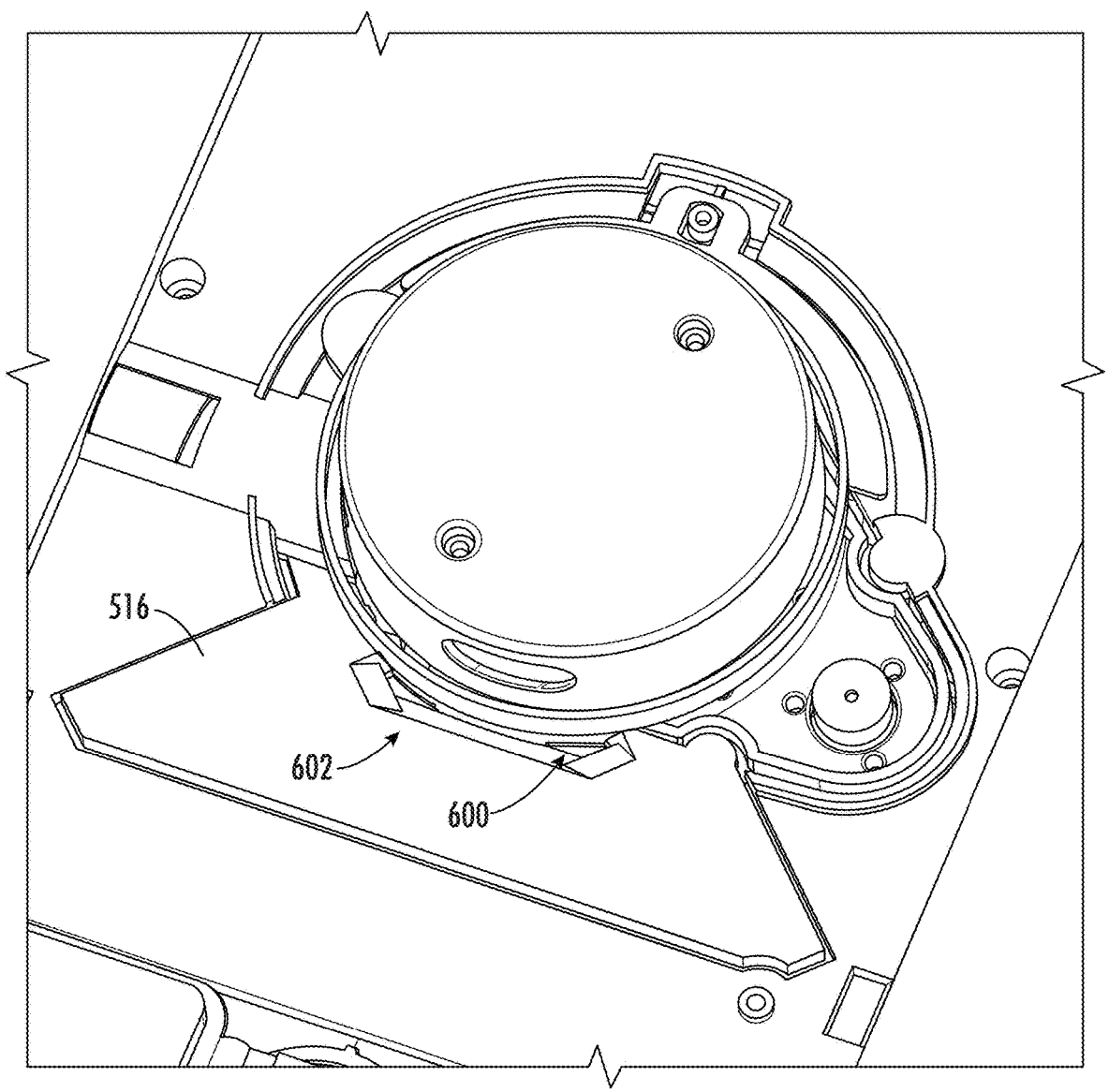
FIG. 6 is a perspective view of a portion of the robotic cleaner of FIG. 5 having portions removed therefrom, consistent with embodiments of the present disclosure.

As shown, a liquid passage 512 may be defined between the protective cover 502 and a body 514 of the robotic cleaner 500. The liquid passage 512 is fluidly coupled to a drain passage 515 that allows liquid to pass through the robotic cleaner 500 and to, for example, a surface to be cleaned. At least a portion of the drain passage 515 may be defined by a liquid tray 516. As shown in FIG. 6, the liquid tray 516 may include one or more liquid apertures 600 within a V-groove 602. In some instances, the liquid tray 516 and the protective cover 502 may be formed from the same body. Alternatively, the protective cover 502 and the liquid tray 516 may be coupled together. Referring back to FIG. 5, liquid flowing along a liquid flow path 518 that extends through the liquid passage 512 and the drain passage 515 may flow toward the navigation sensor 510 before flowing in a direction away from the navigation sensor 510. In some instances, liquid may flow along a secondary flow path 520 that extends over the second liquid diverter 506. Liquid flowing along the secondary flow path 520 corresponds to liquid that flows through the viewing aperture 508. As such, liquid flowing along the secondary flow path 520 is redirected in a direction away from the navigation sensor 510.

An example of a robotic cleaner, consistent with the present disclosure, may include a body having a top surface, a navigation sensor extending from the top surface of the body, a protective cover defining a sensor cavity, the navigation sensor being at least partially received within the sensor cavity, and a cover liquid diverter extending from an upper portion of the protective cover, the cover liquid diverter being flared in a direction of the body.

In some instances, the cover liquid diverter may have a flare angle in a range of 50° to 85°. In some instances, the body may include a body liquid diverter. In some instances, the body liquid diverter and the cover liquid diverter may be configured to cooperate to urge a liquid in a direction away from the navigation sensor. In some instances, the cover liquid diverter may horizontally overlap with at least a portion of the body liquid diverter. In some instances, at least a portion of the body liquid diverter may be configured to urge liquid towards a drain opening. In some instances, a moveable bumper may be moveably coupled to a forward portion of the body, wherein the drain opening is disposed between at least a portion of the moveable bumper and the navigation sensor. In some instances, a bottom surface of the cover liquid diverter may define a diverter channel. In some instances, the cover liquid diverter may define a protective cover receptacle configured to receive at least a portion of the protective cover. In some instances, the cover liquid diverter may further define a plate receptacle configured to receive at least a portion of a plate, the plate being configured to cover a joint formed between the protective cover and the cover liquid diverter.

Another example of a robotic cleaner, consistent with the present disclosure, may include a body having a top surface, a light detection and ranging (LIDAR) sensor configured to rotate, a protective cover defining a sensor cavity, the LIDAR sensor being at least partially received within the sensor cavity, and a cover liquid diverter extending from an upper portion of the protective cover, the cover liquid diverter being flared in a direction of the body.

In some instances, the cover liquid diverter may have a flare angle in a range of 50° to 85°. In some instances, the body may include a body liquid diverter. In some instances, the body liquid diverter and the cover liquid diverter may be configured to cooperate to urge a liquid in a direction away from the LIDAR sensor. In some instances, the cover liquid diverter may horizontally overlap with at least a portion of the body liquid diverter. In some instances, at least a portion of the body liquid diverter may be configured to urge liquid towards a drain opening. In some instances, a moveable bumper may be moveably coupled to a forward portion of the body, wherein the drain opening is disposed between at least a portion of the moveable bumper and the LIDAR sensor. In some instances, a bottom surface of the cover liquid diverter may define a diverter channel. In some instances, the cover liquid diverter may define a protective cover receptacle configured to receive at least a portion of the protective cover. In some instances, the cover liquid diverter may further define a plate receptacle configured to receive at least a portion of a plate, the plate being configured to cover a joint formed between the protective cover and the cover liquid diverter.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:
1. A robotic cleaner comprising:
a body having a top surface;
a suction inlet;
a dust cup fluidly coupled to the suction inlet;
a suction motor fluidly coupled to the dust cup;
a navigation sensor extending from the top surface of the body;
a protective cover defining a sensor cavity, the navigation sensor being at least partially received within the sensor cavity, the protective cover including a viewing aperture through which the navigation sensor emits signals; and
a cover liquid diverter extending from an upper portion of the protective cover, the cover liquid diverter being flared in a direction of the body such that the cover liquid diverter horizontally overlaps with a portion of the top surface of the body, wherein the viewing aperture extends between the cover liquid diverter and the top surface of the body.

2. The robotic cleaner of claim 1, wherein the cover liquid diverter has a flare angle in a range of 50° to 85°.

3. The robotic cleaner of claim 1, wherein the body includes a body liquid diverter.

4. The robotic cleaner of claim 3, wherein the body liquid diverter and the cover liquid diverter are configured to cooperate to urge a liquid in a direction away from the navigation sensor.

5. The robotic cleaner of claim 4, wherein the cover liquid diverter horizontally overlaps with at least a portion of the body liquid diverter.

6. The robotic cleaner of claim 3, wherein at least a portion of the body liquid diverter is configured to urge liquid towards a drain opening.

7. The robotic cleaner of claim 6 further comprising a moveable bumper moveably coupled to a forward portion of the body, wherein the drain opening is disposed between at least a portion of the moveable bumper and the navigation sensor.

8. The robotic cleaner of claim 1, wherein a bottom surface of the cover liquid diverter defines a diverter channel.

9. The robotic cleaner of claim 1, wherein the cover liquid diverter defines a protective cover receptacle configured to receive at least a portion of the protective cover.

10. The robotic cleaner of claim 9, wherein the cover liquid diverter further defines a plate receptacle configured to receive at least a portion of a plate, the plate being configured to cover a joint formed between the protective cover and the cover liquid diverter.

11. A robotic cleaner comprising:
a body having a top surface;
a light detection and ranging (LIDAR) sensor configured to rotate;
a protective cover defining a sensor cavity, the LIDAR sensor being at least partially received within the sensor cavity; and
a cover liquid diverter extending from an upper portion of the protective cover, the cover liquid diverter being flared in a direction of the body, wherein:
the body includes a body liquid diverter; and
at least a portion of the body liquid diverter is configured to urge liquid towards a drain opening.

12. The robotic cleaner of claim 11, wherein the cover liquid diverter has a flare angle in a range of 50° to 85°.

13. The robotic cleaner of claim 11, wherein the body liquid diverter and the cover liquid diverter are configured to cooperate to urge a liquid in a direction away from the LIDAR sensor.

14. The robotic cleaner of claim 13, wherein the cover liquid diverter horizontally overlaps with at least a portion of the body liquid diverter.

15. The robotic cleaner of claim 11 further comprising a moveable bumper moveably coupled to a forward portion of the body, wherein the drain opening is disposed between at least a portion of the moveable bumper and the LIDAR sensor.

16. The robotic cleaner of claim 11, wherein a bottom surface of the cover liquid diverter defines a diverter channel.

17. The robotic cleaner of claim 11, wherein the cover liquid diverter defines a protective cover receptacle configured to receive at least a portion of the protective cover.

18. The robotic cleaner of claim 17, wherein the cover liquid diverter further defines a plate receptacle configured to receive at least a portion of a plate, the plate being configured to cover a joint formed between the protective cover and the cover liquid diverter.

19. A robotic cleaner comprising:
a body having a top surface;
a navigation sensor extending from the top surface of the body;
a protective cover defining a sensor cavity, the navigation sensor being at least partially received within the sensor cavity; and
a cover liquid diverter extending from an upper portion of the protective cover, the cover liquid diverter being flared in a direction of the body, wherein:
the cover liquid diverter defines a protective cover receptacle configured to receive at least a portion of the protective cover; and
the cover liquid diverter further defines a plate receptacle configured to receive at least a portion of a plate, the plate being configured to cover a joint formed between the protective cover and the cover liquid diverter.

* * * * *